Image

United States Patent
Arceo et al.

(10) Patent No.: US 10,077,993 B2
(45) Date of Patent: Sep. 18, 2018

(54) INDICATING DEVICE WITH SEE-THROUGH CONFIGURATION AND POINTER FOR THE SAME

(71) Applicants: DENSO International America, Inc., Southfield, MI (US); DENSO CORPORATION, Kariya (JP)

(72) Inventors: Marc Arceo, Southfield, MI (US); Gareth Webb, Southfield, MI (US); Cary Horvath, Southfield, MI (US); Jagadeesh Krishnamurthy, Southfield, MI (US); Austin Simpson, Southfield, MI (US)

(73) Assignees: DENSO International America, Inc., Southfield, MI (US); DENSO CORPORATION, Kariya, Aichi-pref (JP)

( * ) Notice: Subject to any disclaimer, the term of this patent is extended or adjusted under 35 U.S.C. 154(b) by 240 days.

(21) Appl. No.: 15/005,326

(22) Filed: Jan. 25, 2016

(65) Prior Publication Data
US 2017/0115140 A1    Apr. 27, 2017

Related U.S. Application Data

(60) Provisional application No. 62/245,565, filed on Oct. 23, 2015.

(51) Int. Cl.
*G01D 13/26* (2006.01)
*G01D 13/04* (2006.01)

(52) U.S. Cl.
CPC .......... *G01D 13/265* (2013.01); *G01D 13/04* (2013.01)

(58) Field of Classification Search
CPC ........ G01D 11/28; G01D 13/00; G01D 13/04; G01D 13/26; G01D 13/265; G01D 11/00; G01D 11/24; B60K 35/00; B60K 37/00; B60K 37/02; B60K 2350/203; B60K 2350/206; B60K 2350/2086; G12B 11/00; G12B 11/04; G12B 9/00; G12B 9/02; G12B 9/04
USPC ......................................... 116/284–288, 302
See application file for complete search history.

(56) References Cited

U.S. PATENT DOCUMENTS 7,629,874 B2 * 12/2009 Araki ................. G01D 7/002
                                                340/309.16
2008/0100841 A1 * 5/2008 Han ..................... G01D 11/28
                                                356/364

FOREIGN PATENT DOCUMENTS

| JP | 2003-202247 A | 7/2003 |
| JP | 2009-180623 A | 8/2009 |
| JP | 2009-216661 A | 9/2009 |

\* cited by examiner

*Primary Examiner* — Lisa Caputo
*Assistant Examiner* — Irving A Campbell

(57) ABSTRACT

A pointer for an indicating device includes a conductor. The conductor includes a front portion, a rear portion, and a receiving portion. The rear portion extends from the front portion. The receiving portion extends from the rear portion. The receiving portion is configured to receive light and to conduct the light through the rear portion toward the front portion. The receiving portion has a cutout dented into the receiving portion.

12 Claims, 11 Drawing Sheets

INDICATING DEVICE WITH SEE-THROUGH CONFIGURATION AND POINTER FOR THE SAME

CROSS REFERENCE TO RELATED APPLICATION

This application claims the benefit and priority of U.S. provisional patent application U.S. 62/245,565 filed on Oct. 23, 2015, the entire disclosure of which is incorporated hereby reference.

TECHNICAL FIELD

The present disclosure relates to an indicating device. The present disclosure relates to a pointer for the indicating device.

BACKGROUND

Conventionally, an indicating device such as a dial gauge includes a pointer rotational to indicate information such as a speed or an engine revolution of a vehicle. An indicating device may desirably have an enhanced visibility of information and illuminative effect.

SUMMARY

The present disclosure addresses the above-described concerns. According to an aspect of the preset disclosure, a pointer if for an indicating device. The indicating device may have a dial plate and a trim ring. The pointer may include a shaft, a body connected with the shaft, and a needle extended from the body and configured to conduct light therethrough. The needle may include a root, a see-through portion, and a tip. The root may extend from the body. The see-through portion may extend from the root. The tip may extend from the see-through portion. When viewed along an axial direction of the shaft, the see-through portion has a conductivity of light greater than a conductivity of light of both the tip and the root.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

First Embodiment

As follows, an indicating device 1 will be described with reference to drawings. In drawing(s), "VERTICAL" may correspond to a vertical direction. "AXIAL" may correspond to an axial direction. "RADIAL" may correspond to a radial direction. "CIRCUMFERENTIAL" may correspond to a circumferential direction.

Figure 1:
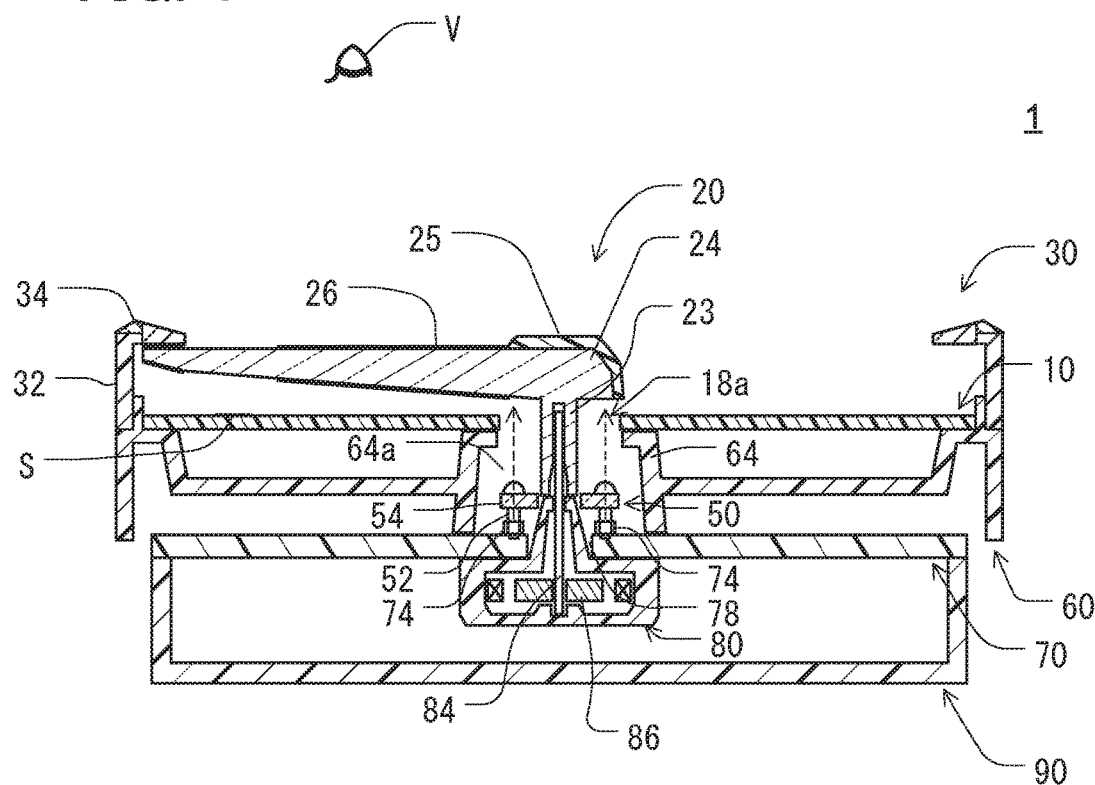
FIG. 1 is a sectional view showing an indicating device.
Figure 1:
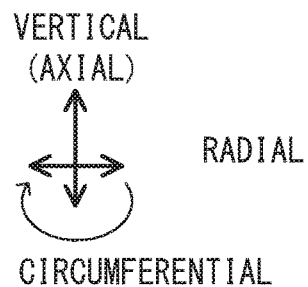

In FIG. 1, the indicating device 1 is, for example, an engine revolution meter for an automobile. The indicating device 1 includes a pointer 20, a dial plate 10, a dial cover 30, a prism 50, a main housing 60, a printed circuit board (PCB) 70, a driver unit 80, and a rear housing 90.

The dial plate 10 has a display surface facing a viewer V such as an occupant of an automobile. The dial plate 10 is in a circular shape when viewed from the viewer V. The dial plate 10 has indication marks such as a dial gauge and symbols S to form a gauge meter. The symbols S may be numbers to denote engine revolution. The dial plate 10 may be formed of resin such as polycarbonate. The dial plate 10 has a center hole 18a at its center.

The dial cover 30 is a tubular member placed above the dial plate 10. The pointer 20 is inserted in the center hole 18a of the dial plate 10. The pointer 20 is located adjacent to the display surface of the dial plate 10. The pointer 20 includes a shaft 23, a body 24, a needle 26, and a cover 25.

In the example, the shaft 23, the body 24, and the needle 26 are formed of a non-opaque light-conductive material such as a translucent resin (e.g., polycarbonate resin or PMMA resin). The needle 26 is substantially at a right angle relative to the shaft 23. The body 24 and the needle 26 are located above a center hole 18a of dial plate 10. The shaft 23 extends through the center hole 18a. The cover 25 is formed of an opaque material such as ABS resin. The cover 25 is coupled with the body 24 to enclose the body 24.

The PCB 70 is located between the main housing 60 and the rear housing 90. The PCB 70 has a center hole 78 at its center. The PCB 70 is equipped with electronic wirings and electronic devices such as a microprocessor. The PCB 70 is further equipped with light emitting diodes (LED) 74 around the center hole 78.

The driver unit 80 is equipped to the PCB 70. The driver unit 80 may be an electric motor such as a stepper motor. The driver unit 80 includes a drive shaft 84 and a motor portion 86. The drive shaft 84 is coupled with a rotor of the motor portion 86. The motor portion 86 includes a stator configured to receive electricity from a controller (not shown) via the wiring of the PCB 70 to generate a magnetic field and to drive the drive shaft 84 via the rotor. The driver unit 80 may be equipped with reduction gears combined with the motor portion 86. The drive shaft 84 is coupled with the shaft 23 of the pointer 20 to manipulate the pointer 20 at an appropriate position to point the tick marks and the symbols S on the dial plate 10.

The main housing 60 includes a housing center 64 defining a tubular hollow 64a. The prism 50 is located in the tubular hollow 64a and is supported by the PCB 70. The rear housing 90 is equipped to the PCB 70 to accommodate the driver unit 80.

Figure 2:
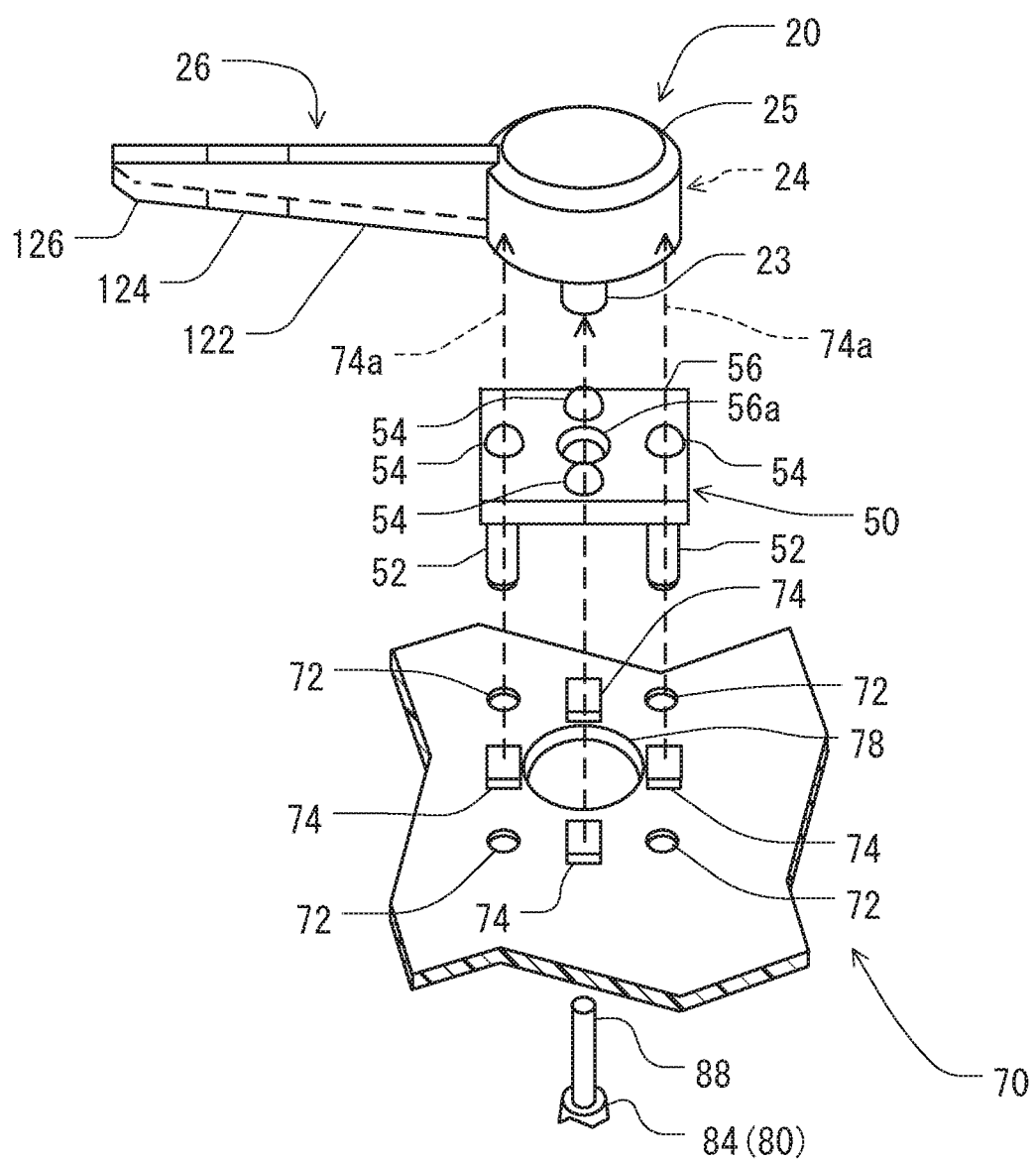
FIG. 2 is a perspective view showing components of the indicating device.

As shown in FIG. 2, according to the present example, the prism 50 includes a prism body 54 in a rectangular plate shape. The prism body 54 is integrally formed with four legs 52 and four lenses 56. The prism 50 is formed of a light-conductive material such as a translucent resin. The lenses 56 are faced to the pointer 20. The legs 52 are attached to support holes 72 formed in the PCB 70 to support the prism 50 on the PCB 70. The shaft 23 of the pointer 20 and the drive shaft 84 of the driver unit 80 are coupled together to extend through a prism hole 56a of the prism 50 and the center hole 78 of the PCB 70.

The LEDs 74 are positioned on the PCB 70, such that optical axes of the lenses 56 of the prism 50 are aligned with optical axes 74a of the LEDs 74, respectively. When each of the LEDs 74 is energized, the LED 74 emits light through the prism body 54 and the lens 56 toward the pointer 20. In this way, the light illuminates the pointer 20. The lens 56 amplifies the light from the LED 74 and directs the light toward the pointer 20. In this way, the prism 50 rectifies the light from the LED 74.

Figure 3:
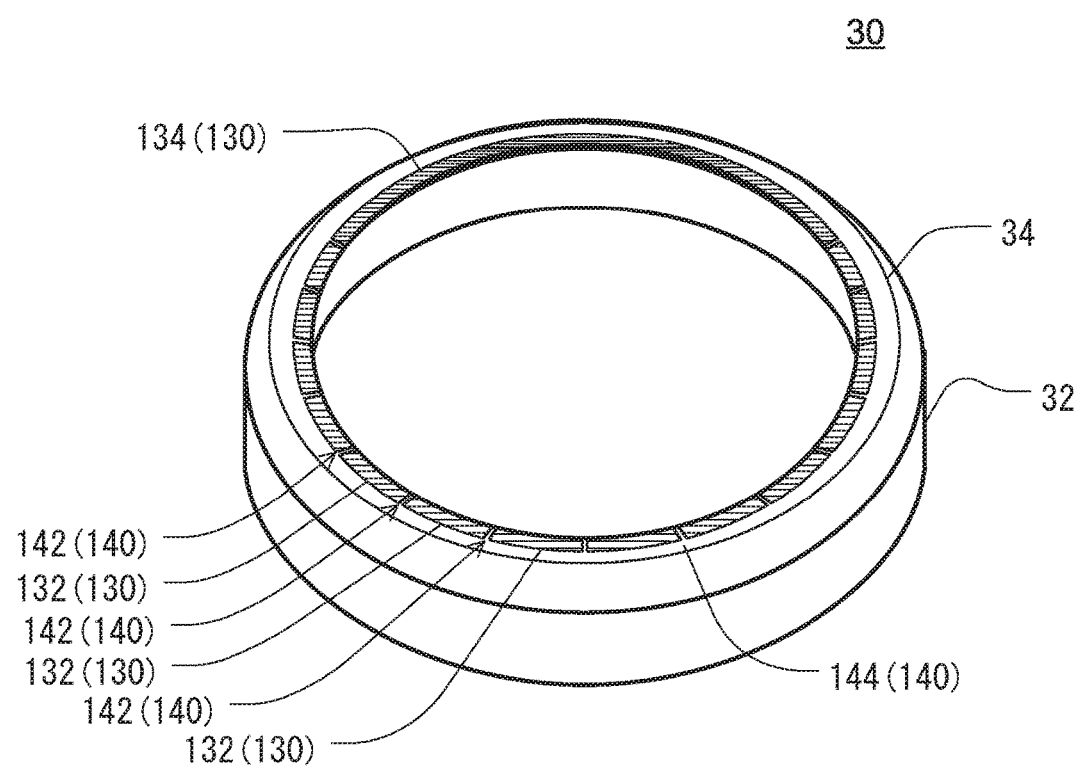
FIG. 3 is a perspective view showing a dial cover of the indicating device.
Figure 8:
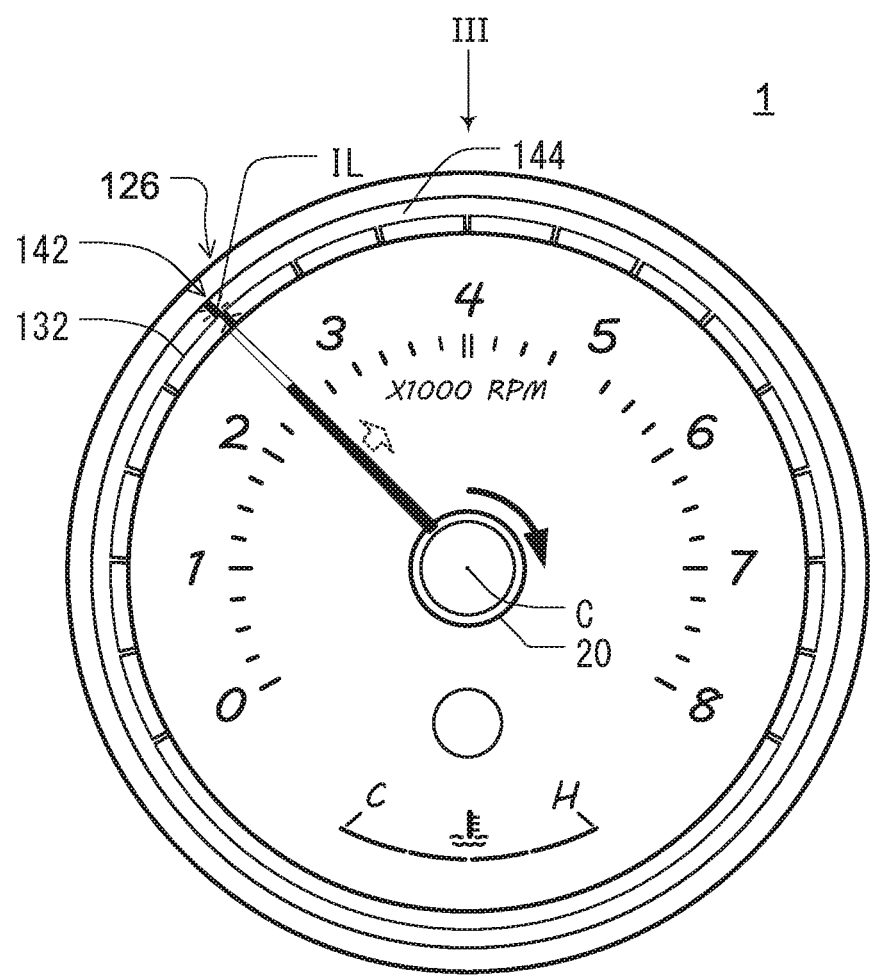
FIG. 8 is a plan view showing the indicating device.

FIG. 3 shows the dial cover 30 viewed from an upper side along an angle shown by III in FIG. 8. In FIG. 3, the dial cover 30 includes a cover body 32 and a trim ring 34. The cover body 32 is a tubular member. The trim ring 34 is an annular disc-shaped member connected on a top end of the cover body 32. The trim ring 34 may be integrally formed with the cover body 32. The trim ring 34 is formed of a non-opaque and light-conductive material. The non-opaque and light-conductive material may be translucent resin such as polycarbonate resin and/or PMMA resin.

The trim ring 34 is opaque at an opaque portion 130 and is non-opaque at a non-opaque portion 140. The opaque portion 130 includes shades 132 and a bottom shade 134. The non-opaque portion 140 includes tick marks 142 and an outer ring 144.

In the disclosure, the opaque portion 130 has a conductivity of light, which is lower than a conductivity of light of the non-opaque portion 140. Specifically, the opaque portion 130 is less light-conductive than the non-opaque portion 140. That is, the opaque portion 130 is higher than the non-opaque portion 140 in an optically shielding property. The term of opaque represents a less light-conductive optical property or non light-conductive optical property such as totally opaque, smoked, colored, or scarcely see-through. The term of non-opaque represents, for example, a light-conductive optical property such as totally transparence, or partially transparence.

The shades 132 and the bottom shade 134 may be formed on a surface of the trim ring 34 by, for example, hot stamping and/or pad printing (tampography). The tick marks 142 and the outer ring 144 may be formed by laser etching. Alternatively, the shades 132 and the bottom shade 134 may be formed by applying a non-opaque material such as smoke painting on the trim ring 34. The tick marks 142 and the outer ring 144 may be formed by masking when applying the non-opaque material on the trim ring 34.

Each of the tick marks 142 is a thin strip in a liner shape extending in the radial direction. Each of the shades 132 is in an arc strip shape extending in the circumferential direction. The tick marks 142 and the shades 132 are arranged alternately in the circumferential direction at a predetermined interval in a meter range. The meter range corresponds to a rotational angular range of the meter pointer 20. In the present example, the meter range may be between 0 rpm and 8000 rpm. The bottom shade 134 extends in the circumferential direction within a range other than the meter range. The outer ring 144 is in a ring shape and located on the outside of both the tick marks 142 and the shades 132 in the radial direction. The tick marks 142 are connected with the outer ring 144 at radially outer ends. Therefore, the tick marks 142 extend radially inward from the outer ring 144.

Figure 4:
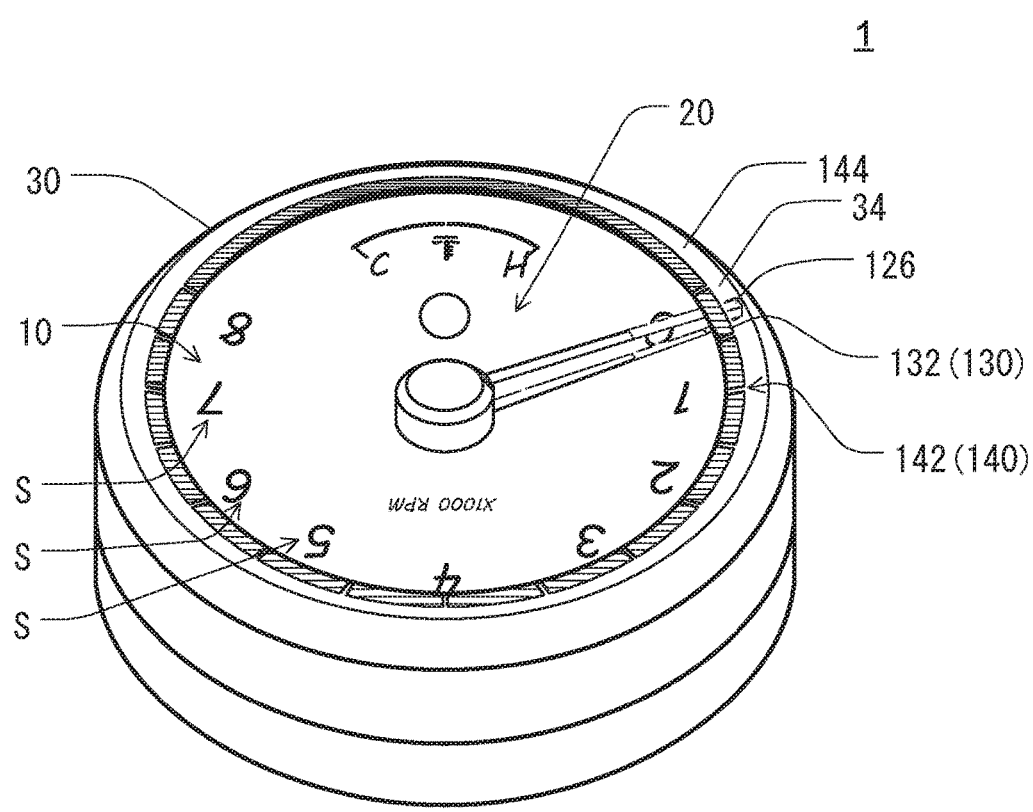
FIG. 4 is a perspective view showing the indicating device.

FIG. 4 shows the indicating device 1 viewed form the angle shown by III in FIG. 8. In FIG. 4, the indicator device is assembled by placing the dial cover 30 on the dial plate 10. An illuminative tip 126 of the pointer 20 is entirely located below the trim ring 34. Specifically, the illuminative tip 126 is partially below the outer ring 144 and is viewable through the outer ring 144. In addition, the illuminative tip 126 is partially concealed by the shade 132 when located below the shade 132. The illuminative tip 126 is viewable through the tick mark 142 when located below the tick mark 142.

Figure 5:
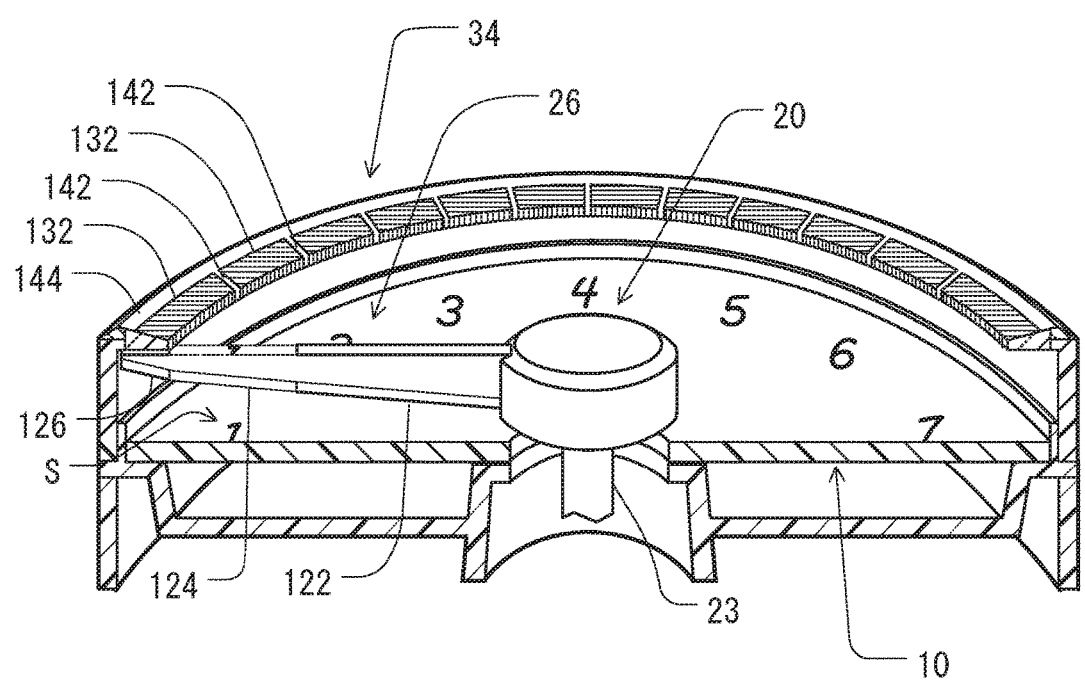
FIG. 5 is a sectional perspective view showing components of the indicating device at assembled positions.

In FIG. 5, the illuminative tip 126 is located between the trim ring 34 and the dial plate 10. The illuminative tip 126 is rotational below the trim ring 34. A see-through portion 124 of the pointer 20 is above the symbol S formed on the dial plate 10.

Figure 6:
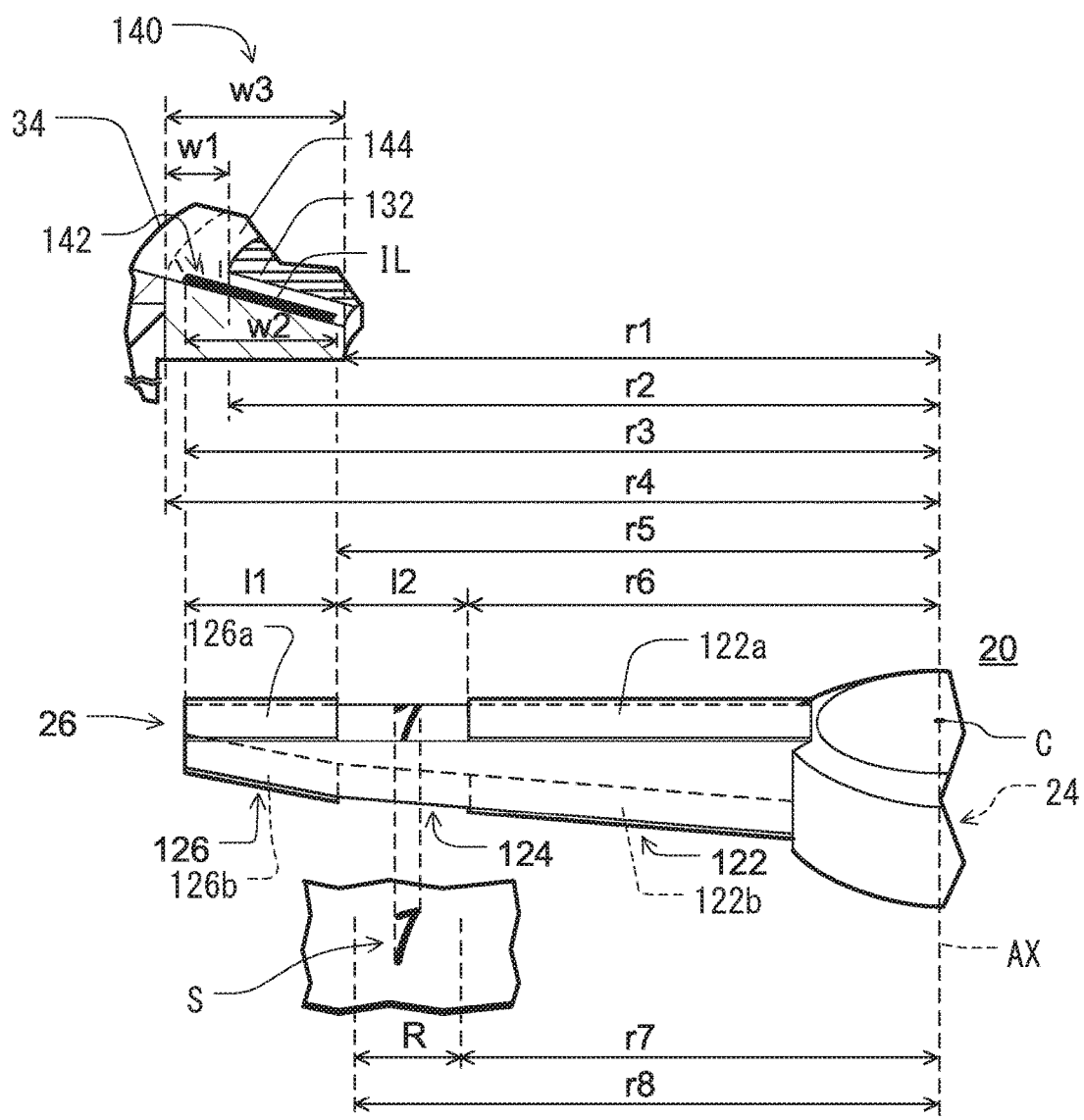
FIG. 6 is a schematic perspective view showing a trim ring, a pointer, and a dial plate of the indicating device.
Figure 7:
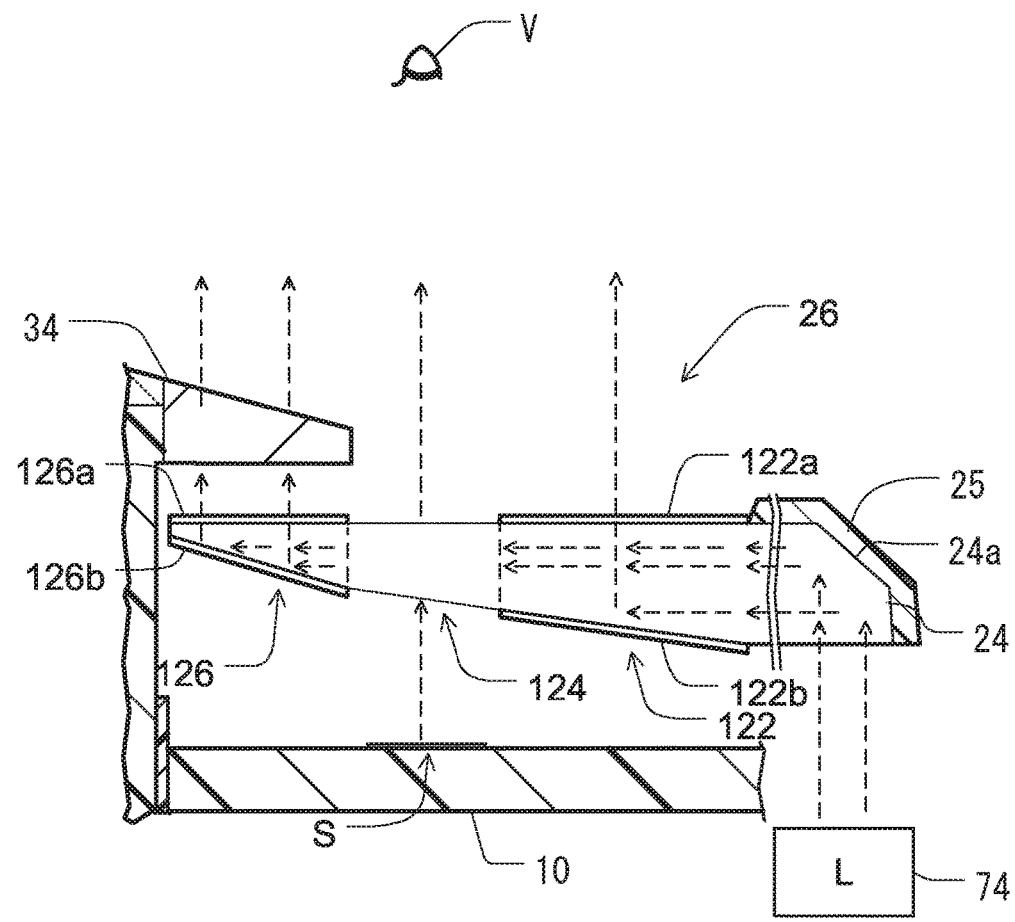
FIG. 7 is a schematic side view showing the trim ring, the pointer, and the dial plate.

As shown in FIGS. 6 and 7, the needle 26 of the pointer 20 has an illuminative root 122, the see-through portion 124, and the illuminative tip 126, which are extended from the body 24 in this order. Specifically, the illuminative root 122 extends from the body 24. The see-through portion 124 extends from the illuminative root 122. The illuminative tip 126 extends from the see-through portion 124. The illuminative tip 126, the see-through portion 124, and the illuminative root 122 are integrally formed of a light-conductive material, such as translucent resin (e.g., polycarbonate resin and/or PMMA resin).

The needle 26 has a top surface and a bottom surface in the axial direction. The axial direction is along an axis AX of the shaft 23 of the pointer 20. In this example, the illuminative tip 126 has illuminative layers 126a and 126b on both the top surface and the bottom surface in the axial direction. In addition, the illuminative root 122 has illuminative layers 122a and 122b on both the top surface and the bottom surface. The illuminative layers 122a, 122b, 126a, 126b may be formed by, for example, hot stamping, pad printing (tampography) and/or applying (spraying) illuminative material. The see-through portion 124 does not have an illuminative layer on both the top surface and the bottom surface. That is, a base light-conductive material of the see-through portion 124 may be exposed on the upper surface and the bottom surface.

Thus, when viewed along the axial direction of the shaft 23, the see-through portion 124 may be viewed translucent, and both the illuminative tip 126 and the illuminative root 122 may be viewed colored. That is, the see-through portion 124 is further light-conductive than both the illuminative tip 126 and the illuminative root 122. In other words, the see-through portion 124 has a conductivity of light greater than a conductivity of light of both the illuminative tip 126 and the illuminative root 122.

The needle 26 has side surfaces, which are perpendicular to the top surface and the bottom surface. The side surfaces may not have an illuminative layer. That is, the base material of the needle 26 may be exposed entirely on the side surfaces. Therefore, the needle 26 may be entirely see-through when viewed from one of the side surfaces to the other of the side surfaces.

In FIG. 7, the body 24 of the pointer 20 receive light from the light source after passing the prism (FIG. 2). The body 24 has a reflective surface 24a to reflect light and to direct the light toward the needle 26.

The illuminative tip 126 and the illuminative root 122 receive the light on the illuminative layers on the bottom side and reflect the light along the axial direction to pass through the illuminative layers. Thus, the illuminative layers illuminate when reflecting the light and when passing the light therethrough. To the contrary, the see-through portion 124 does not illuminate itself when receiving the light. That is, the see-through portion 124 is translucent on receiving the light. Therefore, the see-through portion 124 conducts the symbol S therethrough from the bottom surface to the top surface and shows the symbol S on the top surface, even when receiving the light (FIG. 6).

As follows, dimensions of components of the indicating device 1 will be described with reference to FIG. 6. Relative relationships among the components will be described in a state where the indicating device 1 is viewed along the axial direction of a rotational center C of the pointer 20. The rotational center C of the pointer 20 corresponds to the axis AX around which the pointer 20 is rotational.

In FIG. 6, the center C is at a distance r1 from an inner end of the trim ring 34. The center C is at a distance r2 from an outer end of the shade 132. The center C is at a distance r3 from an outer end of the illuminative tip 126 of the needle 26. The center C is at a distance r4 from an outer end of the outer ring 144. The center C is at a distance r5 from an inner end of the illuminative tip 126. The center C is at a distance r6 from an outer end of the illuminative root 122. The center C is at a distance r7 from an inner end of a symbol range R. The center C is at a distance r8 from an outer end of the symbol range R.

The illuminative tip 126 has a length l1, which is a difference between the distances r3 and r5. The length l1 is the same as a width w2 of an illumination IL. The see-through portion 124 has a length l2, which is a difference between the distances r5 and r6. The outer ring 144 has a width w1, which is a difference between the distances r4 and r2. The non-opaque portion 140 of the trim ring 34 has a width w3, which is a difference between the distances r4 and r1. The width w3 corresponds to the total length of both the outer ring 144 and the tick mark 142 in the radial direction. The symbol range R is a difference between the distances r7 and r8. The symbol range R defines a region within which the symbols S are located in the radial direction.

The distance r1 is less than the distance r5. That is, the inner end of the illuminative tip 126 is farther from the center C than the inner end of the trim ring 34. Therefore, the inner end of the illuminative tip 126 is located entirely below the trim ring 34 and is concealed by the trim ring 34. The distance r3 is between the distances r2 and r4. That is, the outer end of the illuminative tip 126 resides within the width w1 of the outer ring 144. Therefore, the outer end of the illuminative tip 126 is viewable regularly through the outer ring 144 even when the illuminative tip 126 is partially behind the shade 132.

The length l1 is less than the width w3. That is, the illuminative tip 126 is shorter than the width of the non-opaque portion 140 of the trim ring 34. Therefore, the illumination IL appears within a limited region of the trim ring 34.

The distance r5 is greater than the distance r8, and the distance r6 is less than the distance r7. That is, the length l2 of the see-through portion 124 is greater than the symbol range R. Therefore, the symbols S on the dial plate 10 are smaller than the see-through portion 124 in the radial direction. Therefore, the symbols S are entirely viewable through the see-through portion 124. That is, both the illuminative tip 126 and the illuminative root 122 are regularly away from the symbols S in the radial direction and do not conceal the symbols S.

As follows, operation of the indicating device will be described with reference to FIGS. 8 to 11. FIG. 8 shows the indicating device when viewed along the axial direction of the rotational center C of the pointer 20. In FIG. 8, the pointer 20 is at an angle slightly lower than an angular position of one tick mark 142 corresponding to 2500 RPM. The illuminative tip 126 produces the illumination IL at the outer ring 144 and a lower part of the tick mark 142.

Figure 9:
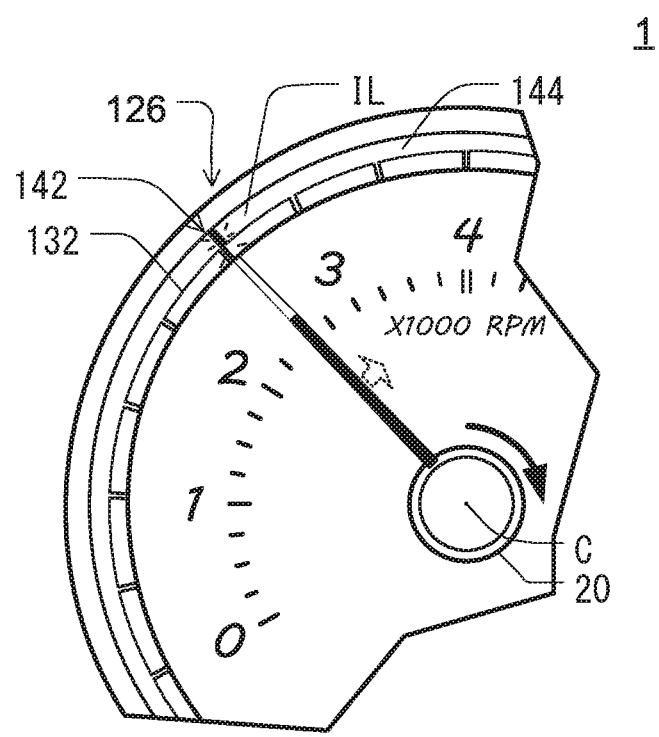
FIG. 9 is a partial view showing one state of the indicating device.

The pointer 20 in FIG. 8 rotates clockwise to be in the state of FIG. 9. The pointer 20 is at an angle slightly greater than an angular position of the one tick mark 142. The illuminative tip 126 produces the illumination IL at the outer ring 144 and an upper part of the tick mark 142.

Figure 10:
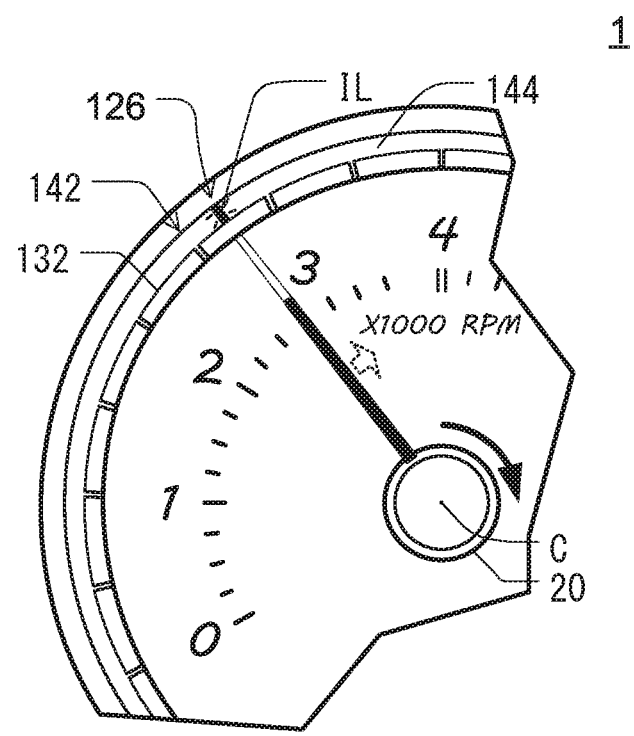
FIG. 10 is a partial view showing another state of the indicating device.

The pointer 20 in FIG. 9 further rotates clockwise to be in the state of FIG. 10. The pointer 20 is at an angle corresponding to an angular position of one shade 132. Therefore, the pointer 20 is located below the one shade 132 and is partially concealed by the one shade 132. Thus, the illuminative tip 126 produces the illumination IL only at the outer ring 144.

Figure 11:
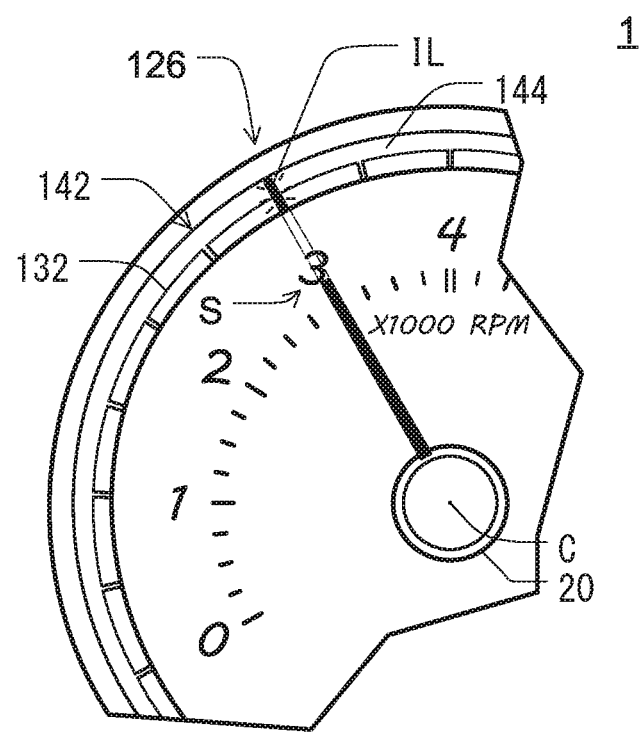
FIG. 11 is a partial view showing another state of the indicating device.

The pointer 20 in FIG. 10 further rotates clockwise to be in the state of FIG. 11. In this state, the pointer 20 directs one tick mark 142 corresponding to 3000 RPM. The illuminative tip 126 produces the illumination IL at the outer ring 144 and entirely at the tick mark 142. The symbol S, which is 3, is viewable through the see-through portion 124 of the pointer 20.

As described above, as the pointer 20 rotates relative to the dial plate 10 and the trim ring 34, the illuminative tip 126 is partially viewable through the tick mark 142 and is partially concealed by shade 132 alternately. In addition, the illuminative tip 126 is partially viewable through the tick mark 142 and is partially masked by shade 132 alternately. The illuminative tip 126 is viewable through the outer ring 144, regularly. In addition, the symbol S is viewable through the see-through portion 124 of the pointer 20 regularly even when the see-through portion 124 is above the symbol S.

Other Embodiments

The indicating device 1 may be used in various control panels or instrument panels other than the engine revolution meter. The prism 50 may be omitted. The LED 74 may be located below the shaft 23. In this case, the shaft 23 may conduct light emitted from the LED 74 toward the reflective surface 24a of the body 24.

The relative relation among the trim ring 34, the needle 26 of the pointer 20 may be arbitrarily modified. In FIG. 6, the distance r5 may be less than the distance r1. That is, the inner end of the illuminative tip 126 may be located beyond the inner end of the trim ring 34 inward in the radial direction. When viewed along the axial direction, the width of the illuminative tip 126 may be greater than the width of the tick mark 142 or may be less than the width of the tick mark 142. The see-through portion 124 may be omitted. The outer ring 144 may be omitted. The tick mark 142 may be omitted. Alternatively of or in addition to the outer ring 144 and/or the tick mark 142, the trim ring may have various marks. The various marks may include various shapes, such as a star, a circle, and/or a triangle, various letters, and/or the like and combination of those various shapes. For example, the trim ring may have a non-opaque graphical form through which the illuminative tip is partially or entirely viewable for a viewer.

The illuminative tip 126 and the illuminative root 122 may have the illuminative layer on one of the top surface and the bottom surface. At least one of the illuminative tip 126 and the root may be non-illuminative. That is, at least one of the illuminative tip 126 and the root may be merely opaque.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An indicating device comprising:
   a dial plate;
   a pointer rotational relative to the dial plate; and
   a trim ring located above the dial plate, wherein
   the pointer includes a shaft, a body, and a needle,
   the body is connected with the shaft,
   the needle includes a root, a see-through portion, and a tip, which are extended from the body in this order,
   when viewed along an axial direction of the shaft:
   the see-through portion has a conductivity of light greater than a conductivity of light of both the tip and the root; and
   the see-through portion is configured to conduct a symbol, which is on the dial plate, therethrough when the see-through portion is located above the symbol,
   wherein the tip is located between the dial plate and the trim ring,
   the trim ring has a plurality of tick marks located along a circumferential direction at an angular interval, the trim ring further has a plurality of shades,
   the shades and the tick marks are alternately located along the circumferential direction,
   when viewed along the axial direction:
   the shades are opaque; and
   one of the shades conceals at least partially the tip when being above the tip, when viewed along the axial direction:
   the tick marks are non-opaque; and
   the tip is viewable through one of the tick marks when being below the one of the tick marks,
   the trim ring further has an outer ring located outside the tick marks and the shades,
   when viewed along the axial direction:
   the outer ring is non-opaque; and
   the tip is viewable through the outer ring.

2. The indicating device of claim 1, wherein
   the symbol is one of a plurality of symbols located on the dial plate along a circumferential direction of the dial plate,
   the pointer is rotational above the symbols, and
   when viewed along the axial direction, both the tip and the root are normally away from the symbols in a radial direction.

3. The indicating device of claim 1, wherein
   when viewed along the axial direction, the tip is below the trim ring normally and movable below the trim ring.

4. The indicating device of claim 3, wherein
   as the pointer rotates relative to the dial plate and the trim ring, the tip is at least partially viewable through the tick marks and is at least partially concealed by the shades alternately.

5. The indicating device of claim 3, wherein
   the trim ring is formed of a light-conductive material, and the shades are formed on a surface of the trim ring.

6. The indicating device of claim 1, wherein
   the body is configured to conduct light therethrough,
   the body has a reflective surface to reflect light and to direct the light toward the needle,
   the tip and the root are illuminative on receiving light, and when viewed along the axial direction, the see-through portion is translucent.

7. A pointer for an indicating device having a dial plate and a trim ring, the pointer comprising:
   a shaft;
   a body connected with the shaft; and
   a needle extended from the body and configured to conduct light therethrough, wherein
   the needle includes a root, a see-through portion, and a tip,
   the root extends from the body,
   the see-through portion extends from the root,
   the tip extends from the see-through portion,
   when viewed along an axial direction of the shaft, the see-through portion has a conductivity of light greater than a conductivity of light of both the tip and the root wherein the tip is located between the dial plate and the trim ring,
   the trim ring has a plurality of tick marks located along a circumferential direction at an angular interval, the trim ring further has a plurality of shades,
   the shades and the tick marks are alternately located along the circumferential direction,
   when viewed along the axial direction:
   the shades are opaque; and
   one of the shades conceals at least partially the tip when being above the tip,
   when viewed along the axial direction:
   the tick marks are non-opaque; and
   the tip is viewable through one of the tick marks when being below the one of the tick marks,
   the trim ring further has an outer ring located outside the tick marks and the shades,
   when viewed along the axial direction:
   the outer ring is non-opaque; and
   the tip is viewable through the outer ring.

8. The pointer of claim 7, wherein
   the body is configured to conduct light therethrough,
   the body has a reflective surface to reflect light and to direct the light toward the needle,
   when viewed along the axial direction:
   the tip and the root are illuminative on receiving the light; and
   the see-through portion is translucent on receiving the light.

9. The pointer of claim 8, wherein
   the needle has a top surface and a bottom surface in the axial direction,
   the tip has an illuminative layer on at least one of the top surface and the bottom surface,
   the root has an illuminative layer on at least one of the top surface and the bottom surface, and
   the see-through portion does not have an illuminative layer on both the top surface and the bottom surface.

10. The pointer of claim 7, wherein
    the tip, the see-through portion, and the root are integrally formed of a light conductive material.

11. The pointer of claim 7, wherein
when the pointer is equipped to the dial plate:
the see-through portion has a length greater than a symbol range in which the symbol resides on the dial plate; and
the see-through portion is configured to conduct the symbol therethrough from the bottom surface to the top surface and to show a symbol on the top surface.

12. The pointer of claim 7, wherein
the needle has side surfaces, which does not have an illuminative layer, and
the needle is entirely seethrough when viewed from one of the side surfaces to the other of the side surfaces.

* * * * *